United States Patent
Kearns et al.

(10) Patent No.: US 8,832,259 B1
(45) Date of Patent: Sep. 9, 2014

(54) VIRTUAL SERVICE MODE METHODS FOR NETWORK REMOTE MONITORING AND MANAGING SYSTEM

(75) Inventors: James A. Kearns, Cypress, TX (US); Chad Allen Masters, Colorado Springs, CO (US); Randolph John Wolf, Monument, CO (US); Michael J. Brandon, Marietta, GA (US); Marc Branders, Beaconsfield (CA); Andy D. Padla, Townsend, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 924 days.

(21) Appl. No.: 12/588,855

(22) Filed: Oct. 30, 2009

(51) Int. Cl.
*G06F 15/173* (2006.01)
*G06F 15/16* (2006.01)
*H04L 12/58* (2006.01)
*H04L 29/06* (2006.01)
*G06F 21/57* (2013.01)
*G06F 21/55* (2013.01)

(52) U.S. Cl.
CPC .......... *H04L 12/585* (2013.01); *H04L 12/5855* (2013.01); *H04L 63/1441* (2013.01); *H04L 63/1433* (2013.01); *G06F 21/577* (2013.01); *H04L 63/145* (2013.01); *G06F 21/552* (2013.01)
USPC ........... 709/224; 709/220; 709/221; 709/222; 709/223; 709/225; 709/226; 709/227; 709/228; 709/229; 709/249; 713/153; 713/188; 715/738; 715/739; 726/2; 726/22; 726/23; 726/24; 726/25; 726/26; 726/27; 726/28; 726/29; 726/30

(58) Field of Classification Search
CPC ... H04L 12/585; H04L 12/5855; H04L 12/58; H04L 12/54; H04L 12/00; H04L 51/12; H04L 51/14; H04L 51/06; H04L 51/00; H04L 63/145; H04L 63/1441; H04L 63/1433; H04L 63/1416; H04L 63/1408; H04L 63/14; H04L 63/20; H04L 63/205; H04L 63/30; G06F 21/577; G06F 21/552; G06F 21/55; G06F 21/50
USPC ......... 709/220, 223, 221, 222, 224, 225, 226, 709/227, 228, 229, 249; 714/25, E11.02; 718/105; 713/153, 188; 715/738, 739; 726/2, 22, 23, 24, 25, 26, 27, 28, 29, 726/30
See application file for complete search history.

(56) References Cited

U.S. PATENT DOCUMENTS

| | | | | |
|---|---|---|---|---|
| 6,253,243 | B1 * | 6/2001 | Spencer | 709/224 |
| 6,654,915 | B1 * | 11/2003 | Lu et al. | 714/57 |
| 6,832,373 | B2 * | 12/2004 | O'Neill | 717/171 |
| 7,062,527 | B1 * | 6/2006 | Tyrrell, III | 709/201 |
| 7,080,105 | B2 * | 7/2006 | Nakanishi et al. | 1/1 |
| 7,085,805 | B1 * | 8/2006 | Ruberg et al. | 709/203 |
| 7,113,962 | B1 * | 9/2006 | Kee et al. | 1/1 |
| 7,302,608 | B1 * | 11/2007 | Acharya et al. | 714/13 |

(Continued)

*Primary Examiner* — Saket K Daftuar

(57) ABSTRACT

A computer-implemented method for remote monitoring and managing of network devices. The method comprises generating a list of managed devices on a user interface in a central management system, wherein raw events are transmitted from the managed devices to the central management system; marking a device for service on the user interface; and modifying the processing of events originated from the marked device so as to prevent a technical support center from generating a response to the events. Also disclosed is a system for remote monitoring and managing of network devices and a computer program product to assist remote monitoring and managing of network devices.

23 Claims, 6 Drawing Sheets

(56) References Cited

U.S. PATENT DOCUMENTS

| | | | |
|---|---|---|---|
| 7,383,327 B1* | 6/2008 | Tormasov et al. | 709/220 |
| 7,483,762 B2* | 1/2009 | Muro et al. | 700/108 |
| 7,487,390 B2* | 2/2009 | Saika | 714/13 |
| 7,613,875 B2* | 11/2009 | Li et al. | 711/112 |
| 7,707,182 B1* | 4/2010 | Kee et al. | 707/638 |
| 7,761,550 B2* | 7/2010 | Komlenic et al. | 709/223 |
| 7,899,158 B2* | 3/2011 | Kanaan et al. | 379/9 |
| 7,925,729 B2* | 4/2011 | Bush et al. | 709/223 |
| 7,991,950 B2* | 8/2011 | Li et al. | 711/112 |
| 8,150,960 B2* | 4/2012 | Kumbalimutt | 709/224 |
| 2002/0143920 A1* | 10/2002 | Dev et al. | 709/223 |
| 2003/0074394 A1* | 4/2003 | Eshghi | 709/203 |
| 2003/0154146 A1* | 8/2003 | Muro et al. | 705/28 |
| 2003/0182414 A1* | 9/2003 | O'Neill | 709/223 |
| 2003/0229653 A1* | 12/2003 | Nakanishi et al. | 707/200 |
| 2004/0088601 A1* | 5/2004 | Shah et al. | 714/15 |
| 2004/0215755 A1* | 10/2004 | O'Neill | 709/223 |
| 2005/0066019 A1* | 3/2005 | Egan et al. | 709/223 |
| 2005/0114487 A1* | 5/2005 | Peng et al. | 709/223 |
| 2005/0138111 A1* | 6/2005 | Aton et al. | 709/201 |
| 2005/0192820 A1* | 9/2005 | Simon et al. | 705/1 |
| 2006/0015608 A1* | 1/2006 | Becker et al. | 709/224 |
| 2007/0033446 A1* | 2/2007 | Tinkler et al. | 714/47 |
| 2007/0118642 A1* | 5/2007 | Kumbalimutt | 709/224 |
| 2007/0220303 A1* | 9/2007 | Kimura et al. | 714/4 |
| 2007/0234115 A1* | 10/2007 | Saika | 714/13 |
| 2007/0268057 A1* | 11/2007 | Gopal et al. | 327/295 |
| 2008/0063150 A1* | 3/2008 | Kanaan et al. | 379/26.01 |
| 2008/0155169 A1* | 6/2008 | Hiltgen et al. | 711/6 |
| 2008/0155223 A1* | 6/2008 | Hiltgen et al. | 711/173 |
| 2008/0162592 A1* | 7/2008 | Huang et al. | 707/202 |
| 2008/0301175 A1* | 12/2008 | Applebaum et al. | 707/102 |
| 2009/0006884 A1* | 1/2009 | Cahill et al. | 714/4 |
| 2009/0019141 A1* | 1/2009 | Bush et al. | 709/223 |
| 2009/0049457 A1* | 2/2009 | Clark et al. | 719/318 |
| 2009/0187675 A1* | 7/2009 | Kinoshita et al. | 710/8 |
| 2010/0064165 A1* | 3/2010 | Kambara et al. | 714/4 |
| 2010/0246421 A1* | 9/2010 | Marshall | 370/252 |
| 2010/0268672 A1* | 10/2010 | Brugler et al. | 706/11 |
| 2010/0268806 A1* | 10/2010 | Kumar et al. | 709/223 |
| 2010/0274892 A1* | 10/2010 | Legrand et al. | 709/224 |
| 2011/0078574 A1* | 3/2011 | Bowe et al. | 715/736 |

* cited by examiner

VIRTUAL SERVICE MODE METHODS FOR NETWORK REMOTE MONITORING AND MANAGING SYSTEM

TECHNICAL FIELD

The technical field relates generally to computer device monitoring and managing systems, and more particularly to methods and devices that improves the efficiency of a network remote monitoring and managing system.

BACKGROUND

The explosive use of computers has created a huge demand for network remote monitoring and managing systems that provide day-to-day management and maintenance of computer systems and networks. The network remote monitoring and managing systems, such as Hewlett-Packard's Insight Remote Support with Web Based Enterprise Services (WEBES), monitor network-attached devices for conditions that warrant remedial action, administrative attention and provides technical support for hardware, software, and systems.

A common problem encountered by the network remote monitoring and managing systems, such as WEBES, is that a large number of device conditions that result in nuisance calls and subsequent service or repair actions are not due to the malfunction of the monitored devices, but are caused by events generated when the monitored devices are undergoing repair or maintenance. For example, storage arrays, tape libraries and hot plug devices that are undergoing repair or maintenance may send spurious events to the network remote monitoring and managing system. In some cases, the network remote monitoring and managing system may discern a pattern of events and determine that the device sending events is under repair or maintenance. In many other cases, however, the status of the device sending the events cannot be determined by pattern matching or analysis. It often requires voice communications between call specialists and customers, or certain manual operation at the customer end, to signal that the device is under repair or maintenance. A more effective event monitoring method is needed to reduce service delivery cost and backend infrastructure complexity.

SUMMARY

A computer-implemented method for remote monitoring and managing of network devices. The method comprises generating a list of managed devices on a user interface in a central management system, wherein raw events are transmitted from the managed devices to the central management system, marking a device for service on the user interface, and modifying the processing of events originated from the marked device so as to prevent a technical support center from generating a response to the events.

Also disclosed is a system for remote monitoring and managing of network devices. The system comprises a network device comprising a user interface that provides a list of managed devices and allows a user to mark a managed device for service, an event analysis module in a central management server that tags event information originated from the marked device, and a business logic analysis module that sequesters tagged event information at a technical support center, so that the sequestered event information is not responded to by the technical support center.

Also disclosed is a computer program product to assist remote monitoring and managing of network devices. The computer program product comprises a tangible computer readable medium and computer readable code embodied on the computer readable medium for event monitoring and management. The computer readable code comprises computer readable program code configured to enable a processor to generate a user interface that provides a list of managed devices and allows a user to mark a managed device for service, computer readable program code configured to enable a processor to modify the processing of events originated from the marked device, and computer readable program code configured to enable a processor to sequester events originated from the marked device at a technical support center, so that the sequestered events are not responded to by the technical support center.

BRIEF DESCRIPTION OF THE DRAWINGS

Embodiments of the invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

Figure 1:
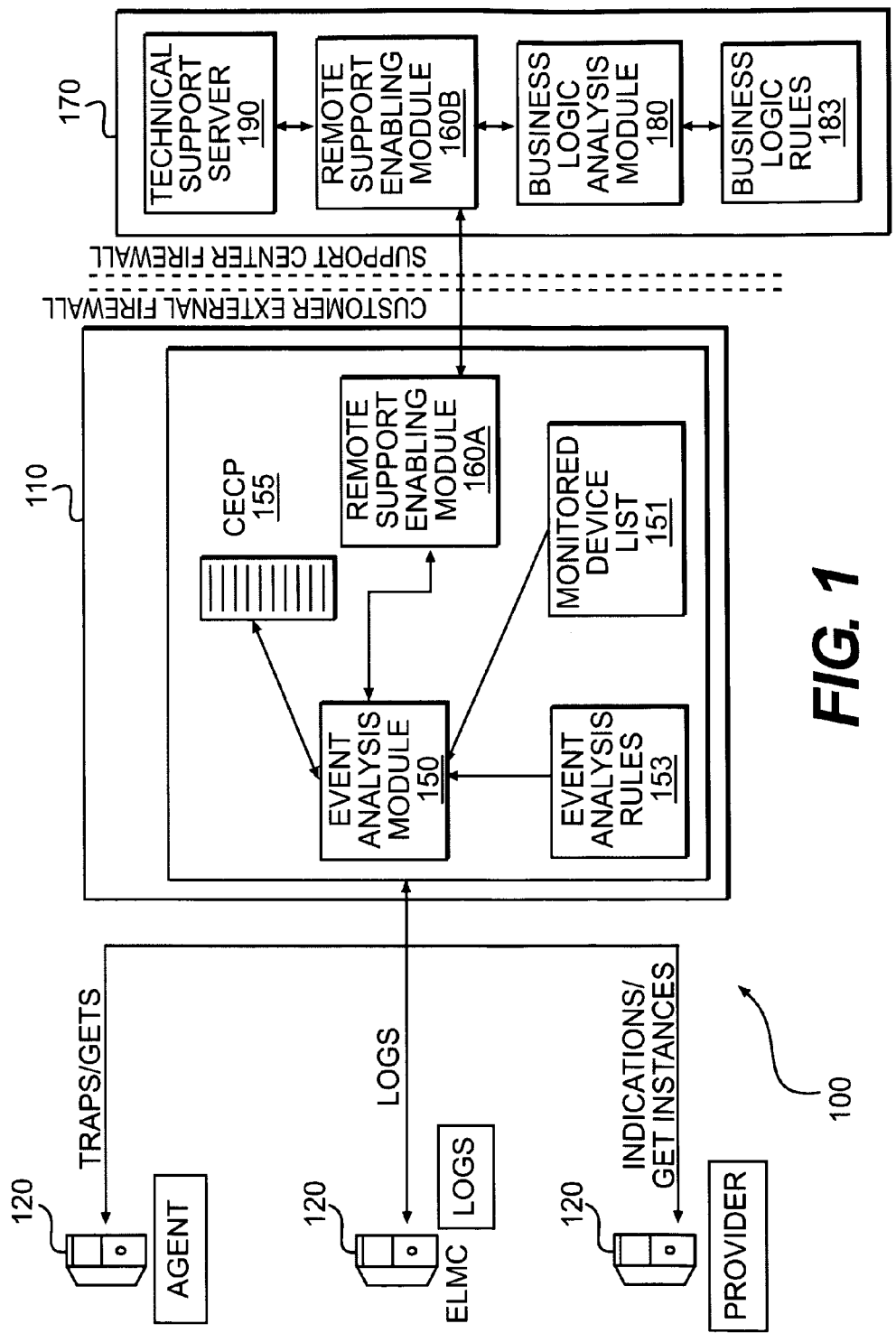
FIG. 1 is a conceptual illustration of a network remote monitoring and managing system.

FIG. 1 is a conceptual illustration of a typical network remote monitoring and managing system 100. The network remote monitoring and managing system 100 includes a central management system (CMS) 110 that monitors and manages a group of devices 120 on a computer network. The CMS 110 executes applications that monitor and control managed devices 120. The CMS 110 provides the bulk of the processing and memory resources required for network management. One or more CMS 110 may exist on any managed network. The managed devices 120 can be any type of device, including, but not limited to, routers, access servers, switches, bridges, hubs, IP telephones, computer hosts, and printers. The CMS 110 may be located on an administrative computer, such as a central management server, or on a managed device 120.

Each managed device 120 executes a software management component, such as an agent, provider or log file depending on the management communications protocol, device type and/or operating system type. The software management component resides on a managed device 120 and reports status events and device information to the CMS 110. The management agent, provider or log file has local knowledge of management information and translates that information to or from a specific form for the network remote monitoring and management system 100. Specifically, the agent, provider or log file may expose management events such as memory correctable ECC (Error Correction Code) errors and disk drive status changes in the form of traps, indications and event log records. The agent, provider or log file may expose management data in the form of configuration attributes, such as "free memory", "system name", "number of running processes", "default route." The agent or provider may also perform active management tasks, such as modifying and applying a new configuration. In one embodiment, the CMS 110 can retrieve the management data information through the GET, GETNEXT and GETBULK protocol operations.

If the CMS 110 is responsible for a large number of devices 120, and each device has a large number of objects, it is impractical for the CMS 110 to poll or request information from every object on every device 120. The solution is for each agent or provider on the managed device 120 to notify the CMS 110 without solicitation. The managed device 120 does this by sending an event or events to the CMS 110 using SNMP (Simple Network Management Protocol) TRAP or WBEM (Web-Based Enterprise Management) INDICATION protocol operations. In the case of event log files, the event information is forwarded by an Event Log Monitoring Collector (ELMC) to the CMS 110.

All data in the forwarded events, including SNMP and WBEM events and ELMC logs, is saved in an event analysis database so that none of the information is lost. The events are formatted in the form of the Common Event Callout Packet (CECP) 155 on the CMS 110. The CECP is an event schema used to translate event status, device and contact information into a standard XML structured format for service incident transmission to the technical support center 170 so that the backend applications at the technical support center 170 can parse the data in a reliable, predictable, and consistent manner.

After the CMS 110 receives an event, the CMS 110 displays the event and analyzes the event. For instance, the CMS 110 can poll the agent directly, or poll other associated device agents to get a better understanding of the event. An event analysis module 150 in the CMS 110 checks the event against a managed device list 151 stored in the CMS 110 and analyzes the events based on a set of pre-determined analysis rules 153. If the event analysis module 150 determines that an event requires remote support, the event analysis module 150 forwards the event to a remote support enabling module 160A in the CMS 110 in the form of a CECP. The remote support enabling module 160A communicates directly with a corresponding remote support enabling module 160B at a technical support center 170 through a firewall or firewalls (e.g., a customer-end firewall and a support-center-end firewall) or a web proxy server (if a web proxy server is in use) and enables remote support, such as service or repair actions, to eligible managed devices 120 from the technical support center 170. Events received at the remote support enabling module 160B are analyzed in a business logic analysis module 180 based on a set of pre-determined business logic rules 183. Those events that require technical support are then forwarded to a technical support server 190. As noted earlier, in a typical network remote monitoring and managing system, a large number of events sent to the technical support server 190 are not the events that truly require technical support, but are spurious events generated at the managed devices 120 that are undergoing repair or maintenance. These events would typically resolve themselves without remote support when the repair or maintenance is completed.

Figure 2:
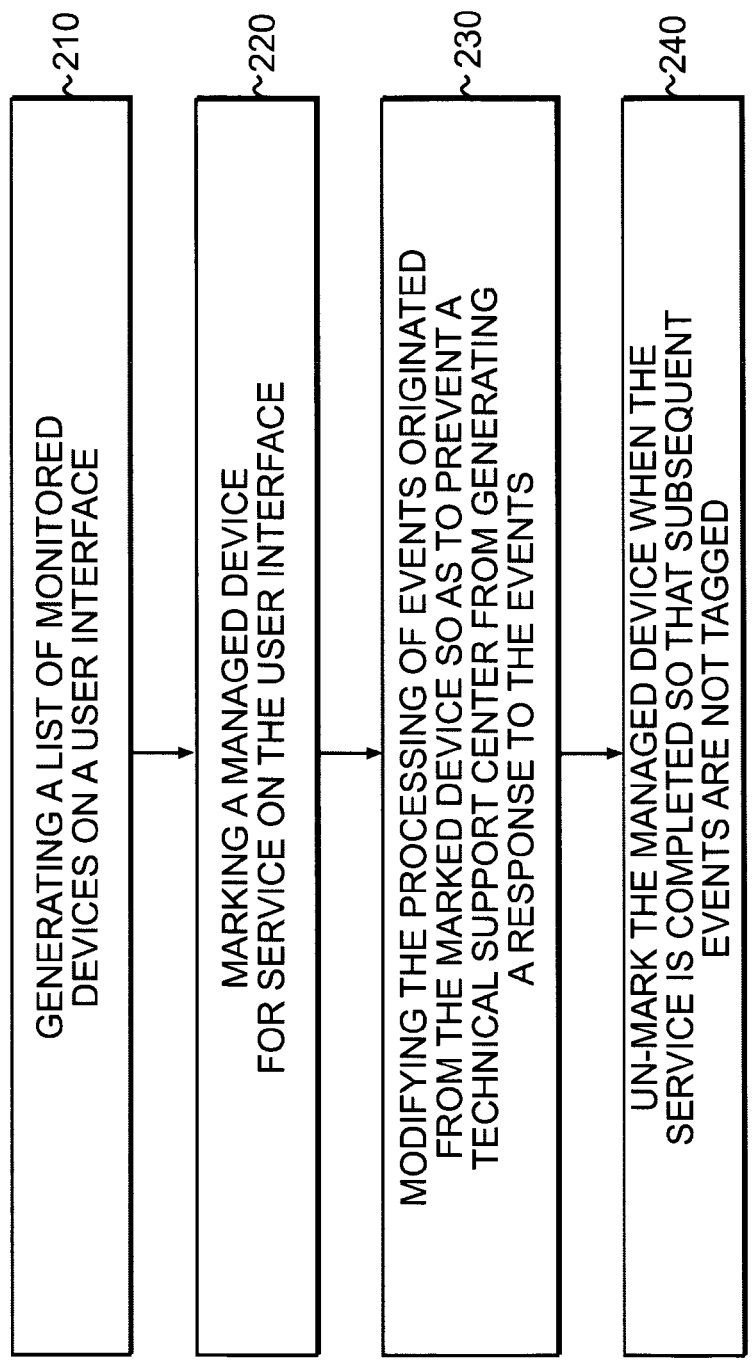
FIG. 2 is a flow chart showing an embodiment of a Virtual Service Mode (VSM) method.

FIG. 2 is a flow chart showing an embodiment of a Virtual Service Mode (VSM) method 200 that allows a system administrator or a service provider to identify those managed devices that are under maintenance. The method 200 includes generating (block 210) a list of monitored devices on a user interface, marking (block 220) a device for service on the user interface, and modifying (block 230) the processing of events originated from the marked device so as to prevent a technical support center from generating a response to the events. The term "service" as used herein, refers to any action that is preformed on a managed device for keeping the managed device in good working order and does not normally require support from the technical support center. Examples of such actions include, but are not limited to, repairs, maintenance, testing, and re-configuration or installation of new software or hardware. The CMS 110 can be an administrative computer, such as a central management server, or a managed device 120 that hosts the managing system.

In one embodiment, the method further includes un-marking (block 240) the marked device when the service is completed, so that subsequent events originated from the device are not tagged.

In another embodiment, the processing of events originated from the marked device is modified by tagging all events originated from the marked device with a Service Mode flag and sequestering the tagged events at the technical support center 190 to prevent the technical support center 190 from generating a response to the tagged events. When a marked device is un-marked, events originated from the un-marked device are no longer tagged.

In another embodiment, the Virtual Service Mode (VSM) method 200 may further comprises the step of providing a start time and a stop time for the scheduled or ongoing service.

The VSM method allows a user, such as a system administrator or service provider, to place managed devices in a service mode at a remote location using a centralized network remote monitoring and management application. The service mode is a true virtual service mode because it is device independent and is applicable to any devices in the network without the need to change the state of the node in any way as this is done from a centralized application that is managing and monitoring those devices.

Figure 3:
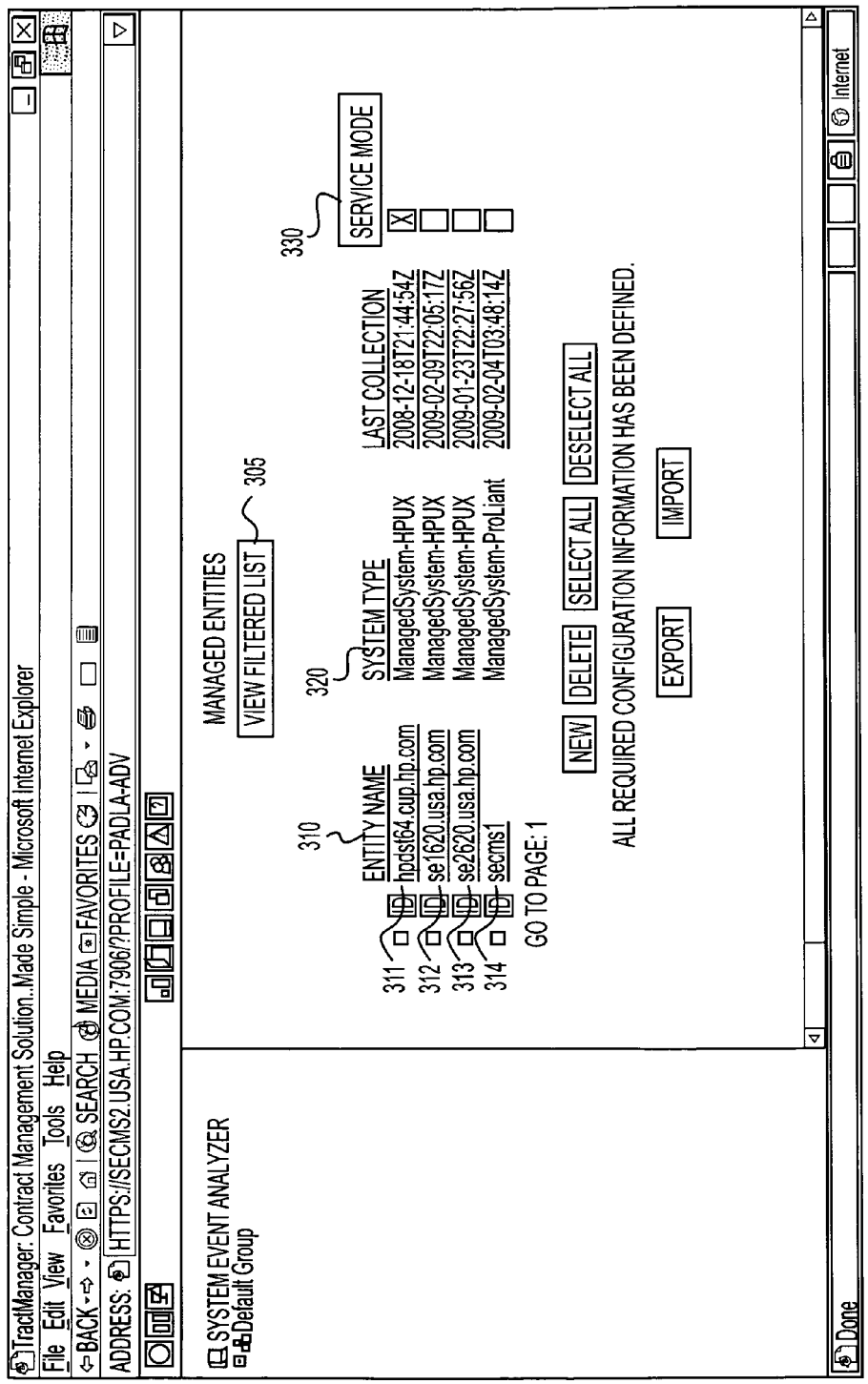
FIG. 3 is a screen shot of a user interface page of a central management system (CMS) that enables a basic VSM function.

FIG. 3 shows a screen shot of a user interface page 300 at a CMS that enables the VSM. The user interface page 300 provides a managed devices list 305 in which managed devices 311-314 are identified by, for example, the entity name 310 and system type 320. The user interface page 300 provides a "Service Mode" column 330 that allows a user, such as a system administrator or service provider, to mark one or more managed devices by checking the corresponding box in the "Service Mode" column 330. Setting the mark on a managed device would cause the network remote monitoring and managing system to enter a "Service Mode" with respect to the marked device. The "Service Mode" setting will suspend remote support for events generated from the marked device, although analysis will continue and remote support incident notifications for un-marked devices are still enabled. Once the service is completed for a managed device, the user will clear the mark corresponding to the managed device (e.g., to uncheck the managed device 311 in the corresponding box in the "Service Mode" column 330). Clearing the mark on a managed device would cause the network remote monitoring and managing system to exit the Service Mode and return to a normal operation mode with respect to the managed device (i.e. all subsequent events from the device will not be tagged). Typically, the default setting in the program that enables the VSM function is to have all the tags in the "Service Mode" column 330 cleared after installation. Each time the program starts or restarts, it will remember the previous VSM settings.

Figure 4:
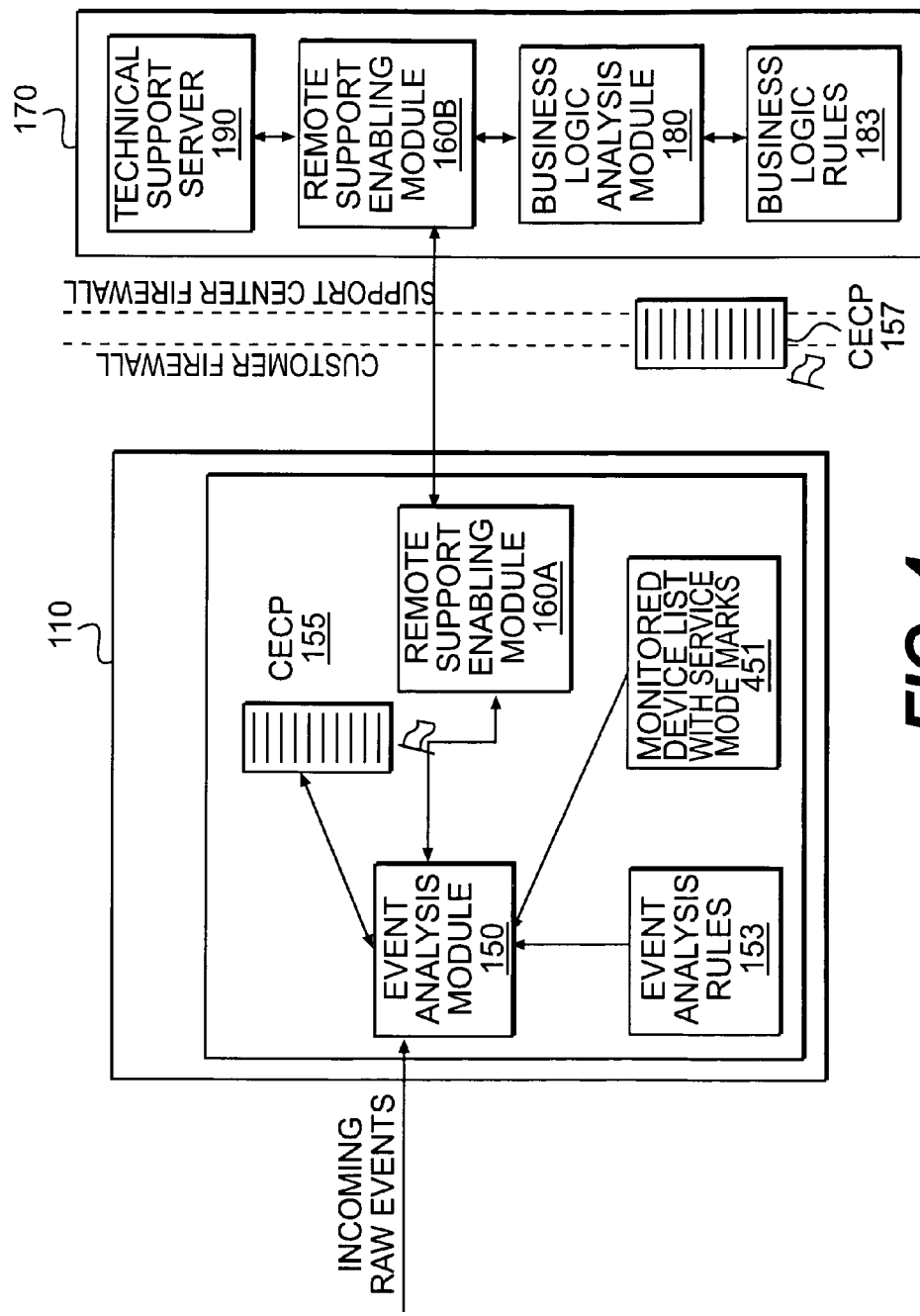
FIG. 4 is a block diagram showing the operation of a CMS with the VSM function.

FIG. 4 is a block diagram showing the basic flow and operation of the CMS device with the VSM function. The event analysis module 150 receives the raw events from the managed devices 120. The raw events are then analyzed using the event analysis rules 153 and if determined to be serviceable are then stored in the event analysis database and are formatted into a CECP 155. The service events are checked against the managed device list 451 that contains the "Service Mode" mark. The event analysis module 150 then places a Service Mode tag in the CECP 155 on all events originating from the managed devices that are marked as in the "Service Mode" in the managed device lists 451 from the time the mark is set. Those tagged events that are deemed to require remote support are forwarded to the technical support center 170 as a remote support incident through the remote support enabling module 160A and 160B. However, the business logic analysis module 180 at the technical service center 170 will sequester the tagged events 157 based on the business logic rules 183 and thus preventing the technical support server 190 from taking any technical support or service delivery actions on these events. In other words, the "Service Mode" tag will suspend normal processing at the technical support center 170 for events generated from the marked devices and suppress remote notification to the technical support server 190 from the marked devices, although analysis of tagged and untagged events, and untagged events remote notification from unmarked devices are still enabled. In one embodiment, the sequestered events are stored in a database at the technical service center 170.

It should be noted that there are no changes made to the marked device or events generated from the marked device. All events generated from a marked device flow normally to the CMS 110 but are tagged as Service Mode by the event analysis module 150. When the service is complete for the marked device, the system administrator or service provider un-mark the device by clearing the Service Mode flag in the user interface.

Figure 5:
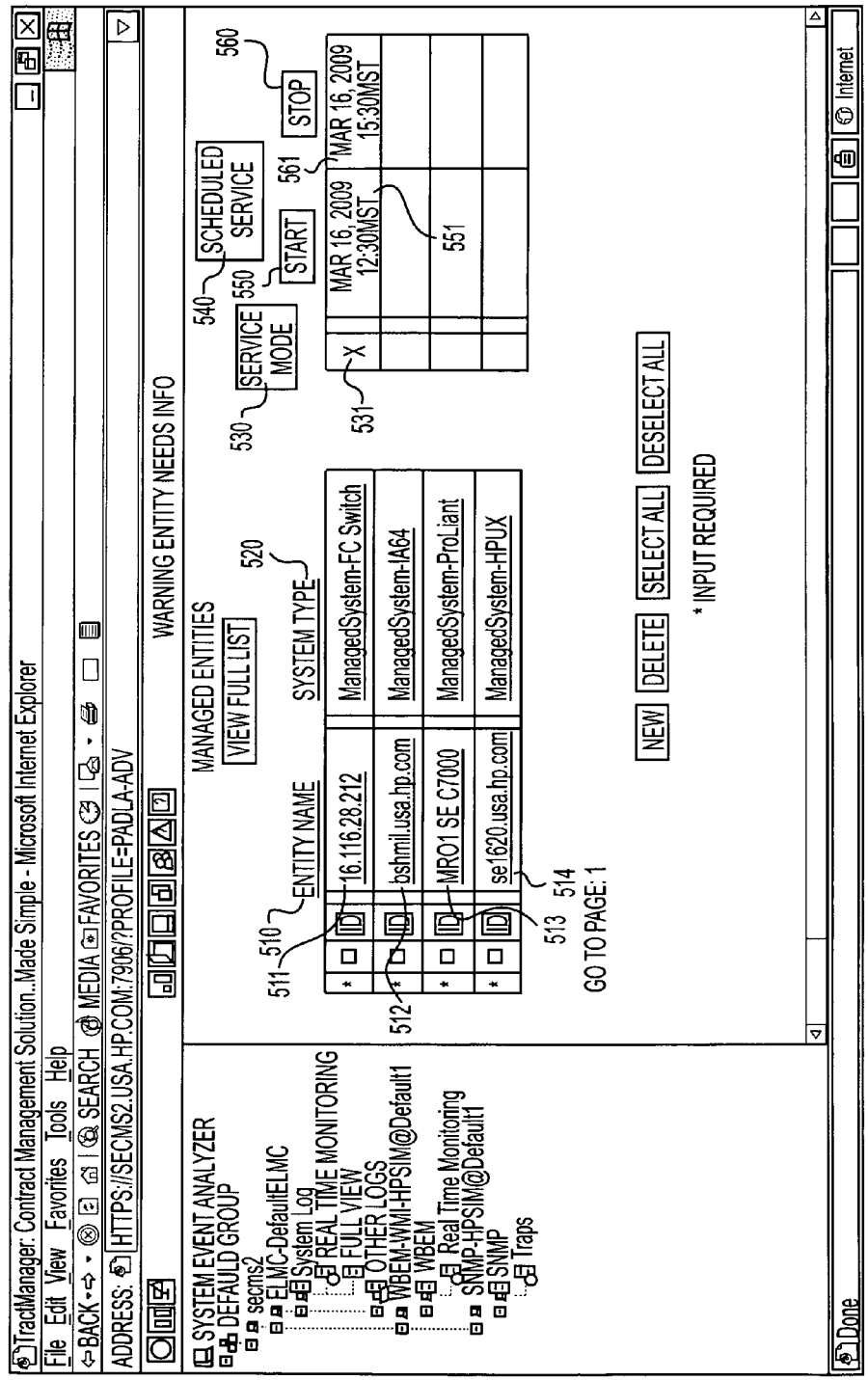
FIG. 5 is a screen shot of a user interface page of a CMS that enables an enhanced VSM function.

FIG. 5 shows a screen shot of a user interface page 500 at a CMS device 110 that enables an enhanced VSM function. Similar to the user interface page 300, the user interface page 500 provides a list of managed devices 511-514 that are identified by the entity name 510 and system type 520, as well as a "Service Mode" column 530 that allows a user to mark one or more managed devices by checking the corresponding box in the "Service Mode" column 530. The enhanced user interface page 500, however, contains a "Scheduled Service" section 540 that includes a "Start" column 550 and a "Stop" column 560. If a managed device is marked in the corresponding Service Mode box (e.g., box 531 for device 511), the user is required to enter a start time and a stop time for the scheduled or ongoing service. In one embodiment, the user has a choice to select/input one of three options:

(1) Using the last input specified by the user for the Start/Stop fields, which will automatically show up in the Start/Stop fields (e.g., box 551 and 561) once the corresponding Service Mode box (e.g., box 531) is checked. This option could be used to enable re-occurrence settings such as maintenance at every weekend.

(2) Entering a new start and stop time to specify a scheduled service window in the form of date and time for each field. This option enables a user to pre-schedule a service and activate the Service Mode only during the scheduled service period.

(3) Entering the term "Flag" or a flag sign in each field, meaning that the user will use the Service Mode flag, not the date/time values, to signify start and stop time. This option allows a user to manually start and stop the Service Mode.

The CMS 110 will store one copy per device of the last user selection in option 2 or option 3 above. When the Service Mode mark is set and the Scheduled Service has been initialized in the managed device, the CMS 110 sends a Start Service Mode message to the technical support center 170 as a remote support incident using fields specified in the CECP. If the Start/Stop fields have date time values, the CMS 110 will send both the start and stop times in the Start Service Mode message. The CMS 110 then tags, in the CECP, all events originating from the monitored device as Service Mode based on the mark in the Service Mode column 530 and Scheduled Service field settings (e.g., all events originating from the managed device between the schedule start time and stop time). When the service is complete for the marked device, either signified by the system administrator or service provider clearing the Service Mode mark in the user interface, or when the Scheduled Service timer expires based on the Stop date/time, the CMS 110 will send a Stop Service Mode message with the actual Stop date/time to the technical support center 170 as a remote support incident using fields specified in the CECP. Expiration of the Scheduled Service timer will automatically clear the Service Mode mark in the corresponding field in the Service Mode column 530, as well as the Start and Stop fields in the user interface 500. The CMS 110, however, will save a copy of the latest Start and Stop fields setting for each device.

Figure 6:
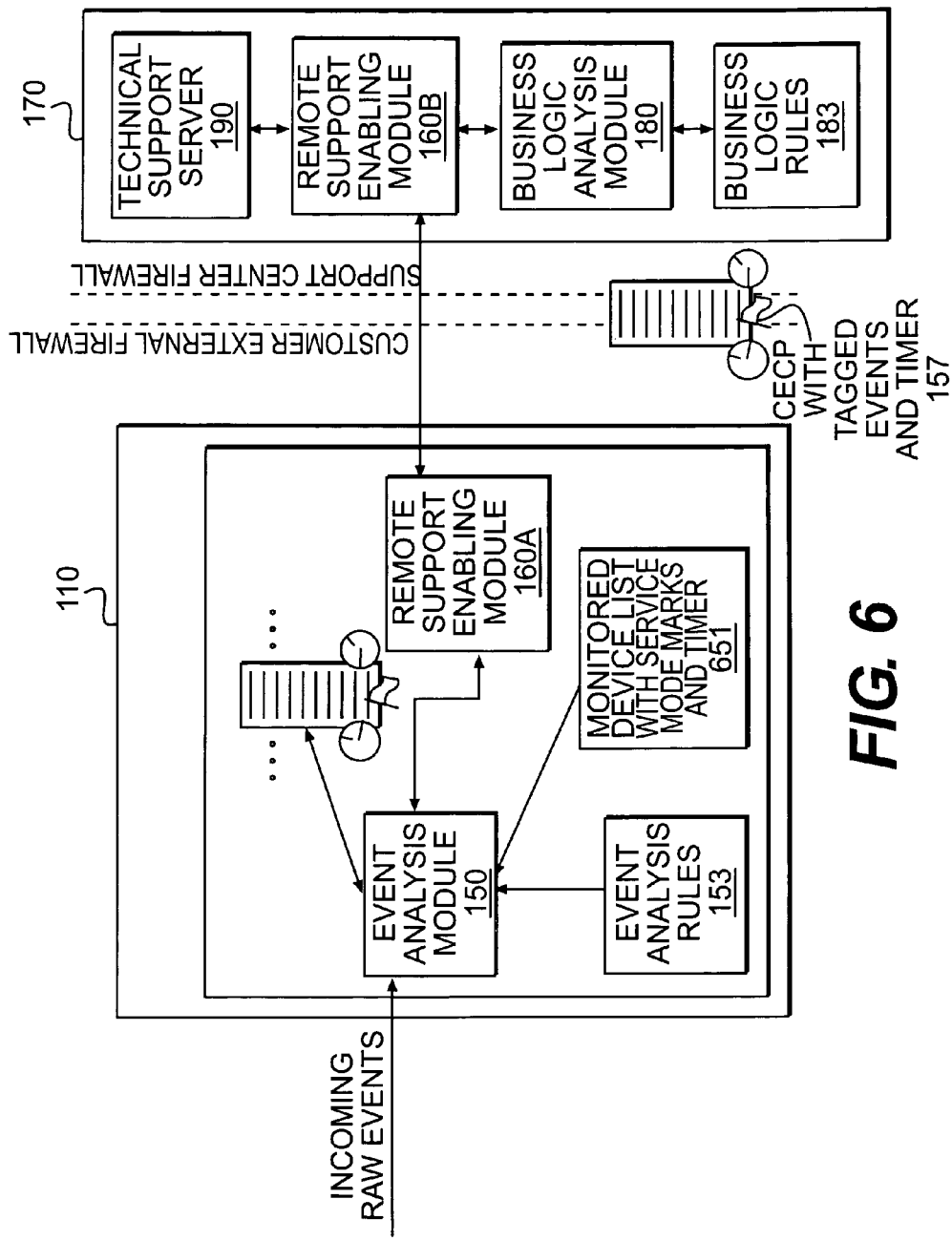
FIG. 6 is a block diagram showing the operation of a CMS with the enhanced VSM function.

FIG. 6 is a block diagram showing the basic flow and operation of the CMS 110 with the enhanced VSM function. The event analysis module 150 receives the raw events from managed devices 120. The raw events are then analyzed using the event analysis rules 153 and if determined to be serviceable are then stored in the event analysis database and are formatted into a CECP 155. The service events are checked against the managed device list 651 that contains the "Service Mode" mark. The event analysis module 150 then places a Service Mode tag on all events originating from the managed devices that are marked as in the "Service Mode" in the managed device lists 651 from the time the mark is set (e.g., in option 3) or from the start time if a start time is set (e.g., in option 1 and 2). The tagged events will be analyzed as usual in the event analysis module 150. Those tagged events that are deemed to require remote support are forwarded to the technical support center 170 as a remote support incident through the remote support enabling module 160A and 160B. However, the business logic analysis module 180 at the technical service center 170 will sequester the tagged events 157 based on the business logic rules 183. If options (1) or (2) is selected in the Start/Stop field 551/561, the business logic analysis module 180 will sequester only the tagged events originated between the scheduled start and stop time. If option (3) is selected in the Start/Stop field 551/561, the business logic analysis module 180 will simply sequester the tagged events in the CECP 155.

In certain system types, the raw events are not analyzed immediately. For example, the event logs forwarded by the ELMC can be stored and analyzed at a later time. This functionality creates the possibility that events occurring during a Service Mode window are not analyzed until after the window has expired. Under such circumstances, the CMS 110 will keep track of the start and stop times of the Service Mode window for a marked device, and check the time of any events originated from that time frame from the device. If an event is from a time during the service window, it is tagged as Service Mode even though the actual analysis in the event analysis module 150 is performed at a time outside the Service Mode window. This feature provides a user the ability to specify scheduled service time at the CMS 110 or at an endpoint managed device 120 using local time.

In one embodiment, the CMS 110 has the ability for analysis rules 153 to read status and set/clear maintenance mode values as well.

In another embodiment, the CMS 110 is capable of using an enterprise management tool, such as HPSIM, to schedule service by device collection, tasks and database queries. For example, the CMS 110 may use an execute database query to group all Windows 2003 x86 servers at particular sites, or group all managed devices into collections based on location (such as Boston, Atlanta and San Francisco) for service. The CMS 110 may run a task that sets Service Mode marks and timers for a collection of devices, such as All Atlanta Windows 2003 x86 Server and place the Atlanta collection in Service Mode from Friday 5 PM to Monday 5 AM, and repeats the task every week. The CMS 110 may add additional controls to start/stop event analysis, service incident submission, etc. in addition to signaling maintenance events as Service Mode.

In another embodiment, the processing behavior in the CMS 110 is modified to disable event analysis of events originated from marked devices in the event analysis module 150 in addition to, or in lieu of, tagging these events as Service Mode. This embodiment reduces impact of service-related events to CMS resources.

In another embodiment, the processing behavior in the CMS 110 is modified to disable remote support incident transmission of events originated from marked devices in addition to, or in lieu of, tagging events as Service Mode. This embodiment reduces network traffic across the firewall or firewalls between the CMS 110 and the technical support center 170.

In another embodiment, the CMS 110 disables transmission of raw events from the marked managed devices to reduce network traffic at the customer site.

Also disclosed is a computer program product to assist remote monitoring and managing of network devices. The computer program product comprises a tangible computer readable medium and computer readable code embodied on the computer readable medium for event monitoring and management. The computer readable code comprises computer readable program code configured to enable a processor to generate a user interface that provides a list of monitored devices and allows a user to mark a monitored device for service, computer readable program code configured to enable a processor to modify the processing of events originated from the marked device, and computer readable program code configured to enable a processor to sequester events originated from the marked device at a technical support center, so that the sequestered events are not responded to by the technical support center.

Tangible computer readable medium is well known in the art. Examples of tangible computer readable medium include, but, are not limited to, hard disks, floppy disks, optical or magnetic disks, CD-ROM RAM, PROM, EPROM, FLASH-EPROM, memory chip, stick and cartridges and any other tangible medium from which a computer can read.

While the invention has been described in connection with what is presently considered to be the most practical and preferred embodiment, it is to be understood that the invention is not limited to the disclosed embodiments, but, on the contrary, is intended to accommodate various modifications and equivalent arrangements. It will be appreciated by those of ordinary skill in the art that a wide variety of alternate and/or equivalent embodiments or implementations calculated to achieve the same purposes may be substituted for the embodiments shown and described. This application is intended to cover any adaptations or variations of the embodiments discussed herein. Therefore, it is manifestly intended that embodiments in accordance with the present invention be limited only by the claims and the equivalents thereof.

What is claimed is:

1. A computer-implemented method for remote monitoring and managing of network devices, comprising:
generating a list of managed devices on a user interface in a central management system, wherein raw events are transmitted from the managed devices to the central management system;
marking a device for service on the user interface;
determining whether the device has been marked for service; and
modifying processing of events originated from the marked device, based upon and in response to a determination that the device is marked for service, so as to prevent a technical support center from generating a response to the events.

2. The method of claim 1, further comprising:
un-marking the marked device when service is complete.

3. The method of claim 1, wherein the modifying the processing of events generated from the marked device comprises:
tagging events originated from the marked device; and
sequestering tagged events at the technical support center, wherein the sequestered events are not responded to by the technical support center.

4. The method of claim 3, wherein the modifying the processing of events generated from the marked device further comprises:
checking received raw events against a managed device list at the central management system.

5. The method of claim 3, wherein the modifying the processing of events generated from the marked device further comprises:
analyzing received events at the central management system.

6. The method of claim 3, wherein the modifying the processing of events generated from the marked device further comprises:
transmitting events from the central management system to the technical support center.

7. The method of claim 1, wherein the marking a device for service comprising setting a service start time and a service stop time, and
wherein the events originated from the marked device are events originated from the marked device between the service start time and the service stop time; and
wherein the modifying the processing of the events to prevent technical support center from generating a response to the events from the marked device is limited to occurring between the service start time and the service stop time.

8. The method of claim 7, further comprising:
sending a start service mode message to the technical service center at the service start time; and
sending a stop service mode message to the technical service center at the service stop time.

9. The method of claim 7, further comprising:
storing the service start time and the service stop time in a memory.

10. The method of claim 7, further comprising:
storing sequestered event information in a database.

11. The method of claim 1, wherein the modifying the processing of events generated from the marked device comprises:
  disabling event analysis of events originated from the marked device in the central management system due to the device being marked for service.

12. The method of claim 1, wherein the modifying the processing of events generated from the marked device comprises:
  disabling remote support incident transmission of events originated from the marked device to the technical support center due to the device being marked for service.

13. The method of claim 1, wherein the modifying the processing of events generated from the marked device comprises:
  disabling transmission of raw events from the marked managed device to the central management system due to the device being marked for service.

14. A system for remote monitoring and managing of network devices, comprising:
  a network device comprising a user interface that provides a list of managed devices, the user interface allows a user to mark a managed device for service;
  an event analysis module in a central management server that tags event information originated from the marked device; and
  a business logic analysis module at a technical support center that sequesters tagged event information, wherein the sequestered event information is not responded to by the technical support center.

15. The system of claim 14, wherein the network device is the central management server.

16. The system of claim 14, wherein the central management server comprises a first remote support enabling module that communicates with a second remote support enabling module in the technical support center.

17. The system of claim 14, wherein the user interface further allows a user to set up a service start time and a service stop time; and
  wherein sequestering of tagged event information is limited to occurring between the service start time and the service stop time.

18. A computer program product to assist remote monitoring and managing of network devices, comprising:
  a tangible non-transitory computer readable medium and computer readable code embodied on the computer readable medium for event monitoring and management, the computer readable code comprising:
  computer readable program code configured to enable a processor to generate a user interface that provides a list of managed devices and allows a user to mark a managed device for service;
  computer readable program code configured to enable a processor to modify the processing of events originated from the marked device; and
  computer readable program code configured to enable a processor to sequester events originated from the marked device at a technical support center, based upon and in response to a determination that the device is marked for service, wherein the sequestered events are not responded to by the technical support center.

19. The computer program product of claim 18, wherein the computer readable program code configured to enable a processor to modify the processing of events originated from the marked device comprises computer readable program code configured to tag events originated from the marked device, and wherein the computer readable program code configured to enable a processor to sequester events originated from the marked device at a technical support center comprises computer readable program code configured to sequester tagged events.

20. The computer program product of claim 19, wherein the computer readable program code configured to enable a processor to generate a user interface that provides a list of monitored devices and allows a user to mark a monitored device for service comprises computer readable program code configured to allow the user to set a service start time and a service stop time; and
  wherein sequestering of tagged event information is limited to occurring between the service start time and the service stop time.

21. The method of claim 1, wherein the list of managed devices includes both managed devices that need servicing and managed devices that do not need servicing.

22. The system of claim 14, wherein the list of managed devices includes both managed devices that need servicing and managed devices that do not need servicing.

23. The method of claim 3, wherein the events from the marked device are tagged and sequestered due to the marked device being marked for servicing.

* * * * *

UNITED STATES PATENT AND TRADEMARK OFFICE
CERTIFICATE OF CORRECTION

| | | |
|---|---|---|
| PATENT NO. | : 8,832,259 B1 | Page 1 of 1 |
| APPLICATION NO. | : 12/588855 | |
| DATED | : September 9, 2014 | |
| INVENTOR(S) | : James A. Kearns et al. | |

It is certified that error appears in the above-identified patent and that said Letters Patent is hereby corrected as shown below:

In the Claims

In column 8, line 50-51, in Claim 7, after "marked device" delete "are events originated from the marked device".

Signed and Sealed this
Twenty-first Day of July, 2015

Michelle K. Lee
*Director of the United States Patent and Trademark Office*